United States Patent
Hwang (10) Patent No.: US 11,120,742 B2
(45) Date of Patent: Sep. 14, 2021

(54) DISPLAY DEVICE INCLUDING POWER MANAGER AND METHOD OF DRIVING DISPLAY DEVICE THAT INCLUDES GENERATING CORRECTED SUPPLY VOLTAGE

(71) Applicant: Samsung Display Co., Ltd., Yongin-Si (KR)

(72) Inventor: Jong Kwang Hwang, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/892,475

(22) Filed: Jun. 4, 2020

(65) Prior Publication Data
US 2021/0174742 A1 Jun. 10, 2021

(30) Foreign Application Priority Data
Dec. 6, 2019 (KR) .................. 10-2019-0161831

(51) Int. Cl.
G09G 3/3258 (2016.01)
H02M 1/08 (2006.01)

(52) U.S. Cl.
CPC ............ *G09G 3/3258* (2013.01); *H02M 1/08* (2013.01); *G09G 2310/08* (2013.01); *G09G 2330/028* (2013.01)

(58) Field of Classification Search
None
See application file for complete search history.

(56) References Cited

U.S. PATENT DOCUMENTS

| | | | |
|---|---|---|---|
| 8,587,575 B2 | 11/2013 | Ahn | |
| 10,134,333 B2 | 11/2018 | Park | |
| 10,347,182 B2 | 7/2019 | Wang | |
| 10,490,127 B2 | 11/2019 | Lee et al. | |
| 2014/0118323 A1 | 5/2014 | Park | |
| 2016/0049111 A1* | 2/2016 | Lee | G09G 3/2022 |
| | | | 345/691 |
| 2017/0039955 A1* | 2/2017 | Park | G09G 3/3233 |
| 2018/0239379 A1* | 8/2018 | Zhang | G05F 1/461 |
| 2020/0090572 A1* | 3/2020 | Wu | G09G 3/20 |

FOREIGN PATENT DOCUMENTS

| | | |
|---|---|---|
| KR | 10-2011-0132545 A | 12/2011 |
| KR | 10-2014-0054760 A | 5/2014 |
| KR | 10-2015-0035073 A | 4/2015 |
| KR | 10-2017-0017035 A | 2/2017 |
| KR | 10-2019-0081832 A | 7/2019 |

\* cited by examiner

*Primary Examiner* — Chad M Dicke
(74) *Attorney, Agent, or Firm* — Innovation Counsel LLP (57) ABSTRACT

Provided herein may be a display device and a driving method thereof. The display device may include a pixel area including multiple pixels, a timing controller configured to generate a control signal based on an input image, a data driver configured to supply a data voltage to data lines coupled to the pixel area depending on the control signal, a scan driver configured to supply scan signals to scan lines coupled to the pixel area depending on the control signal, and a power manager configured to supply an initialization voltage for initializing the multiple pixels and a first supply voltage for driving the multiple pixels to the pixel area. The power manager senses a voltage change in the first supply voltage supplied to the pixel area, and changes the first supply voltage and supplies the same to the pixel area in order to compensate for the sensed voltage change.

20 Claims, 6 Drawing Sheets

DISPLAY DEVICE INCLUDING POWER MANAGER AND METHOD OF DRIVING DISPLAY DEVICE THAT INCLUDES GENERATING CORRECTED SUPPLY VOLTAGE

CROSS-REFERENCE TO RELATED APPLICATION

The present application claims priority to Korean patent application No. 10-2019-0161831 filed on Dec. 6, 2019, the entire disclosure of which is incorporated herein in its entirety by reference.

BACKGROUND

1. Technical Field

Various embodiments of the present disclosure relate to a display device and a method for driving the same, and more particularly, to an organic light-emitting display device and a method for driving the same.

2. Related Art

With the development of information technology, the importance of a display device, which is a connecting medium between information and users, is being emphasized. Accordingly, the use of display devices, such as liquid crystal display devices, organic light-emitting display devices, plasma display devices, and the like, is increasing.

An organic light-emitting display device displays an image using an organic light-emitting diode (OLED) that generates light through recombination of electrons and holes. Such an organic light-emitting display device is attracting attentions as a next-generation display because it has fast response time and is controlled with low power consumption.

The organic light-emitting display device is provided with various kinds of supply voltages for driving and controlling organic light-emitting diodes from a Power Management Integrated Circuit (PMIC).

SUMMARY

Various embodiments of the present disclosure are directed to a display device capable of compensating for the IR drop of a voltage supplied to a light-emitting element.

Furthermore, various embodiments of the present disclosure are directed to a method for driving the display device.

An embodiment of the present disclosure may provide for a display device.

The display device may include a pixel area including pixels, a timing controller configured to generate a control signal based on an input image, a data driver configured to supply a data voltage to data lines coupled to the pixels depending on the control signal, a scan driver configured to supply scan signals to scan lines coupled to the pixels depending on the control signal, and a power manager configured to supply an initialization voltage for initializing the pixels and a first supply voltage for driving the pixels to the pixel area.

The power manager may sense a voltage change of the first supply voltage in the pixel area, and may change the first supply voltage and supply the same to the pixel area in order to compensate for the sensed voltage change.

The power manager may include a voltage change sensor configured to output a first offset voltage based on a first sensing voltage, wherein the first sensing voltage is a voltage difference between an input and an output of the first supply voltage at a predetermined position in the pixel area, a first supply voltage compensator configured to output a reference feedback voltage which is a sum of a preset reference voltage and the first offset voltage for generating the first supply voltage based on the first offset voltage, and a first supply voltage generator configured to change the first supply voltage based on the reference feedback voltage and supply the same to the pixel area.

The voltage change sensor may include a first amplifier including a first input terminal configured to receive the first sensing voltage via a first resistor, a second input terminal configured to receive a first reference supply voltage via a second resistor, and an output terminal configured to output the first offset voltage, and a first feedback resistor coupled between the output terminal and the first input terminal of the first amplifier.

The voltage change sensor may further include a third resistor coupled between the second input terminal and ground.

At least one of the first resistor, the second resistor, the third resistor, and the first feedback resistor may be a variable resistor.

The first supply voltage compensator may include a second amplifier including a first input terminal configured to receive the first offset voltage via a fourth resistor, a second input terminal configured to receive a reference voltage via a fifth resistor, and an output terminal configured to output the reference feedback voltage, and a second feedback resistor coupled between the output terminal and the first input terminal of the second amplifier.

The power manager may further include a voltage difference sensor configured to sense a second sensing voltage in the pixel area and output a second offset voltage which is a voltage difference between the first sensing voltage and the second sensing voltage, wherein the second sensing voltage is a voltage difference between an input and an output of the initialization voltage in the pixel area.

The first supply voltage compensator may output the reference feedback voltage based on the second offset voltage.

The voltage difference sensor may include a third amplifier including a first input terminal configured to receive the first sensing voltage via a sixth resistor, a second input terminal configured to receive the second sensing voltage via a seventh resistor, and an output terminal configured to output the calculated voltage difference between the first sensing voltage and the second sensing voltage, and a third feedback resistor coupled between the output terminal and the first input terminal of the third amplifier.

The voltage difference sensor may further include an eighth resistor coupled between the second input terminal of the third amplifier and ground.

The voltage difference sensor may include a fourth amplifier including a first input terminal configured to receive the calculated voltage difference via a ninth resistor, a second input terminal configured to receive a reference voltage difference via a tenth resistor, and an output terminal configured to output the second offset voltage, and a fourth feedback resistor coupled between the output terminal and the first input terminal of the fourth amplifier.

The first supply voltage generator may output the first supply voltage through an output terminal by changing an input voltage that is received through an input terminal and may change the first supply voltage, output through the output terminal of the first supply voltage generator using the reference feedback voltage applied to a feedback circuit.

The first supply voltage generator may include a first switching element, a second switching element, a switching controller configured to control switching of the first switching element and the second switching element, a voltage distributor configured to output a feedback voltage by distributing the first supply voltage that is output through the output terminal of the first supply voltage generator, and an error amplifier configured to output a control voltage by amplifying an error between the feedback voltage and the reference feedback voltage.

The first supply voltage generator may further include a PWM controller configured to receive the control voltage and a sum frequency signal and to output a Pulse Width Modulation (PWM) control signal for controlling a switching duty ratio between the first switching element and the second switching element.

The switching controller may perform on/off control of the first switching element and the second switching element such that the first switching element and the second switching element are alternately switched using the PWM control signal.

The first supply voltage generator may further include an inductor coupled between the output terminal of the first supply voltage generator and a first node.

The first switching element may be coupled between the first node and the output terminal of the first supply voltage generator.

The second switching element may be coupled between the first node and ground.

Another embodiment of the present disclosure may provide for a method for driving a display device.

The method may include generating a first sensing voltage by sensing a first supply voltage output from a pixel area, outputting a first offset voltage by calculating a differential value between the first sensing voltage and a first reference supply voltage, outputting a first reference feedback voltage by adding the first offset voltage and a reference voltage, and generating a corrected first supply voltage using the first reference feedback voltage.

The method may further include generating a second sensing voltage by sensing an initialization voltage output from the pixel area, calculating a voltage difference between the second sensing voltage and the first sensing voltage, outputting a second offset voltage by comparing the calculated voltage difference and a reference voltage difference, outputting a second reference feedback voltage by adding the output second offset voltage and the reference voltage, and generating the corrected first supply voltage using the second reference feedback voltage.

DETAILED DESCRIPTION

Throughout drawings, the same reference numerals are used to designate similar or identical elements. Further, the thicknesses, ratios, and sizes of elements in the drawings may be exaggerated to make the technical description more effective. The term "and/or" includes all of one or more combinations that can be defined by associated elements.

It will be understood that, although the terms "first" and "second" may be used herein to describe various elements, these elements should not be limited by these terms. These terms are only used to distinguish one element from other elements. For instance, a first element discussed below could be termed a second element without departing from the teachings of the present disclosure. Similarly, the second element could also be termed the first element. In the present disclosure, the singular forms are intended to include the plural forms as well, unless the context clearly indicates otherwise.

Furthermore, the terms "under," "below," "on," and "above" are used to describe spatial relativity between elements illustrated in the drawings. The terms correspond to a relative concept, which will be described based on a direction indicated in the drawings.

In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present disclosure will be described in detail with reference to the accompanying drawings so that those having ordinary knowledge in the technical field to which the present disclosure pertains can easily practice the embodiments. The present disclosure may be embodied in different forms and should not be construed as being limited to the embodiments set forth herein.

Figure 1:
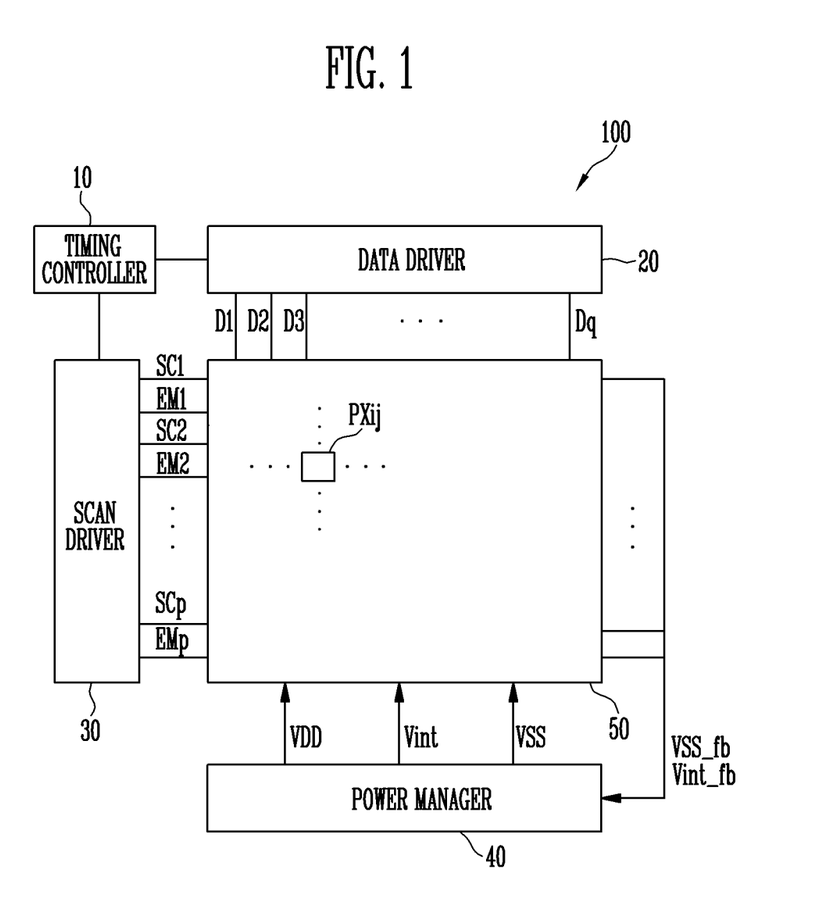
FIG. 1 is a block diagram illustrating a display device according to an embodiment of the present disclosure.

FIG. 1 is a block diagram illustrating a display device according to an embodiment of the present disclosure.

Referring to FIG. 1, a display device 100 according to an embodiment of the present disclosure may include a timing controller 10, a data driver 20, a scan driver 30, a power manager 40, and a pixel area 50.

The timing controller 10 may supply the data driver 20 with grayscale values for each frame, a control signal, and the like. Also, the timing controller 10 may supply the scan driver 30 with a clock signal, a control signal, and the like.

The data driver 20 may generate data voltages to be supplied to data lines D1, D2, D3, . . . , Dq using the grayscale values, the control signal, and the like received from the timing controller 10. For example, the data driver 20 may sample the grayscale values in response to a clock signal and may supply the data voltages corresponding to the grayscale values of one pixel row which is coupled to one scan line to the data lines D1, D2, D3, . . . , Dq at a time. Here, q may be an integer greater than 0. The data driver 20 may include a plurality of driver integrated chips (ICs).

The scan driver 30 may generate scan signals to be supplied to scan lines SC1, SC2, . . . , SCp and emission signals to be supplied to emission lines EM1, EM2, . . . , EMp in response to a clock signal, a control signal, and the like from the timing controller 10. For example, the scan driver 30 may sequentially supply scan signals having a pulse of a turn-on level to the scan lines SC1, SC2, . . . , SCp. For example, the scan driver 30 may generate a carry signal having a pulse of a turn-on level and sequentially supply the carry signal to the next stage in response to the clock signal. Here, p may be an integer greater than 0. For example, the scan driver 30 may be a shift register. Meanwhile, the scan driver 30 may further include output lines (not illustrated) configured to sequentially output an initialization signal and the like to respective scan lines or emission lines.

The power manager 40 may supply a first supply voltage VSS, a second supply voltage VDD, and an initialization voltage Vint to each pixel PXij using the power supplied from a power supply (not illustrated). Here, the first supply voltage VSS may be lower than the second supply voltage VDD and the initialization voltage Vint, and the second supply voltage VDD may be higher than the first supply voltage VSS and the initialization voltage Vint. Also, the initialization voltage Vint may be higher than the first supply voltage VSS and lower than the second supply voltage VDD.

The pixel area 50 includes pixels. Each pixel PXij may be coupled to a data line, an emission line and a scan line corresponding thereto. Here, i and j may be integers, each of which is greater than 0. Also, a light-emitting element in each pixel PXij may emit light using the first supply voltage VSS, the second supply voltage VDD, and the initialization voltage Vint supplied from the power manager 40.

Meanwhile, the power manager 40 may be a separate component separated from the pixel area 50 of the display device 100 and may supply the first supply voltage VSS, the second supply voltage VDD, and the initialization voltage Vint to each pixel PXij in the pixel area 50 through a line coupling the power manager 40 and the each pixel PXij. The first supply voltage VSS may be changed due to an IR drop which is an electrical potential difference between two ends of the current path through which the first supply voltage VSS is supplied to each pixel PXij. When the first supply voltage VSS changes, the luminance of the light-emitting element included in each pixel PXij may be changed too.

The power manager 40 according to an embodiment of the present disclosure may generate a first sensing voltage VSS_fb by sensing the first supply voltage VSS at at least one point of the pixel area 50, and may generate a first supply voltage VSS corrected by compensating for the voltage drop of the first supply voltage VSS which is caused due to the IR drop.

Figure 2:
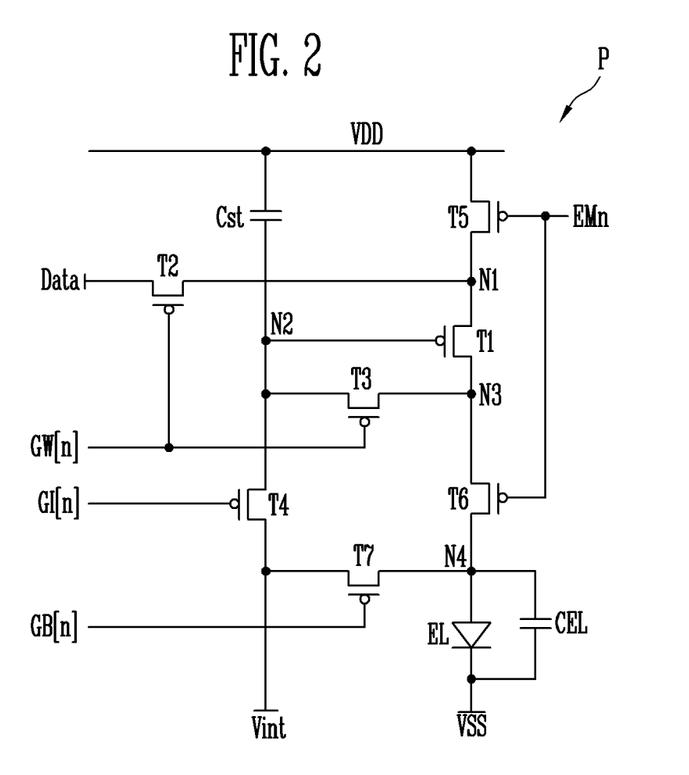
FIG. 2 is a circuit diagram illustrating an embodiment of each pixel included in the pixel area illustrated in FIG. 1.

FIG. 2 is a circuit diagram illustrating an embodiment of each pixel included in the pixel area illustrated in FIG. 1.

Referring to FIG. 2, the pixel P may include a first transistor T1, a second transistor T2, a third transistor T3, a fourth transistor T4, a fifth transistor T5, a sixth transistor T6, a seventh transistor T7, a storage capacitor Cst, and a light-emitting element EL.

The second transistor T2 may be coupled between a data line through which a data voltage Data is supplied and a first node N1 and may be turned on by a first scan signal GW[n] supplied through a scan line. The second transistor T2 may be referred to as a switching transistor.

The first transistor T1 may be coupled between the first node N1 and a third node N3. The first transistor T1 may be referred to as a driving transistor.

The third transistor T3 may be coupled between a second node N2 and the third node N3, and may be turned on by the first scan signal GW[n].

The storage capacitor Cst may be coupled between a line through which a second supply voltage VDD is supplied and the second node N2.

Accordingly, when the second transistor T2 and the third transistor T3 are turned on by the first scan signal GW[n], the data voltage Data supplied through the data line may be charged in the storage capacitor Cst.

The fourth transistor T4 may be coupled between the second node N2 and a line through which an initialization voltage Vint is supplied, and may be turned on by a second scan signal GI[n] supplied through the scan line. When the fourth transistor is turned on by the second scan signal, the voltage charged in the storage capacitor Cst may be initialized to the initialization voltage Vint. That is, when the fourth transistor T4 is turned on by the second scan signal GI[n], the storage capacitor Cst may output a discharge voltage based on the initialization voltage Vint. In a broad expression, the initialization voltage Vint may be defined as the voltage for initializing the pixel P.

The fifth transistor T5 may be coupled between the line through which the second supply voltage VDD is supplied and the first node N1, and may be turned on by an emission signal EMn supplied through an emission line.

The sixth transistor T6 may be coupled between the third node N3 and a fourth node N4, and may be turned on by the emission signal EMn supplied through the emission line.

The anode of the light-emitting element EL is coupled to the fourth node N4, and the cathode thereof is coupled to a line through which a first supply voltage VSS is supplied, whereby the light-emitting element may emit light with the luminance corresponding to a driving current.

Accordingly, when the fifth transistor T5 and the sixth transistor T6 are turned on by the emission signal EMn, a driving current corresponding to the voltage charged in the storage capacitor Cst may be supplied to the light-emitting element EL.

The seventh transistor T7 may be coupled between the line through the initialization voltage Vint is supplied and the fourth node N4, and may be turned on by a third scan signal GB[n]. When the seventh transistor T7 is turned on, a parasitic capacitor CEL included in the light-emitting element EL may be initialized by the initialization voltage Vint. Specifically, the voltage difference (Vint−VSS) between the initialization voltage Vint and the first supply voltage VSS is applied to the parasitic capacitor CEL, whereby the parasitic capacitor CEL may be discharged depending on the applied voltage difference Vint−VSS.

In FIG. 2, the transistors T1, T2, T3, T4, T5, T6 and T7 are illustrated as P-type transistors. Accordingly, when the voltage applied to the gate electrode of a transistor is a low level, it may be referred to as a turn-on level, and when the voltage applied to the gate electrode of the transistor is a high level, it may be referred to as a turn-off level. Those skilled in the art may change at least some of the transistors T1, T2, T3, T4, T5, T6 and T7 to N-type transistors.

Meanwhile, when the initialization voltage Vint or the first supply voltage VSS is changed, the voltage difference Vint−VSS applied to the parasitic capacitor CEL is also changed. For example, when the first supply voltage VSS is changed due to the IR drop described with reference to FIG. 1, the voltage difference Vint−VSS may be changed too. Because the changed voltage difference Vint−VSS changes the discharge characteristics of the parasitic capacitor CEL, the parasitic capacitor CEL is overdischarged or underdischarged. Accordingly, there may be a delay in a light emitting time of the light-emitting element EL which cause an afterimage in a display panel.

The power manager 40 according to an embodiment of the present disclosure senses a change in the voltage difference between the initialization voltage Vint and the first supply voltage VSS and generates a corrected first supply voltage by compensating the first supply voltage VSS depending on the sensed change in the voltage difference, thereby maintaining the voltage difference (Vint−VSS) to have a preset value and maintaining uniform discharge characteristics of the light-emitting element.

Figure 3:
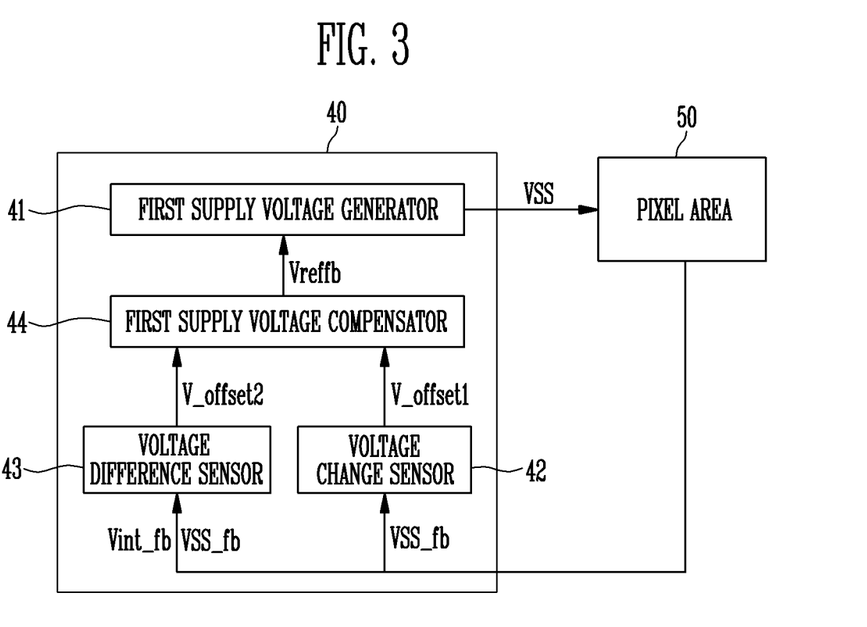
FIG. 3 is a block diagram illustrating the components of the power manager illustrated in FIG. 1.

FIG. 3 is a block diagram illustrating components of the power manager illustrated in FIG. 1.

Referring to FIG. 3, the power manager 40 may include a voltage change sensor 42 configured to sense a voltage change in the first supply voltage VSS supplied to the pixel area 50, a voltage difference sensor 43 configured to sense a change in the voltage difference (Vint−VSS) between the initialization voltage Vint and the first supply voltage VSS sensed from the pixel area 50, a first supply voltage compensator 44 configured to generate a reference feedback voltage Vreffb for the first supply voltage VSS depending on the output of the voltage change sensor 42 or the output of the voltage difference sensor 43, and a first supply voltage generator 41 configured to generate a first supply voltage VSS depending on the reference feedback voltage Vreffb.

The voltage change sensor 42 may sense the first supply voltage VSS in the pixel area 50 and determine an amount of change of the first supply voltage VSS in the pixel area 50, in particular, a difference between an input voltage and an output voltage of the first supply voltage in the pixel area 50(or an amount of an IR drop of the first supply voltage VSS), and may generate a first offset voltage V_offset1 for compensating for the amount of change of the first supply voltage VSS. The first offset voltage V_offset1 may be an amount of change of the first supply voltage VSS in the pixel area 50. Here, the first supply voltage VSS may be sensed at a predetermined position in the pixel area 50 using any of various known methods.

The voltage difference sensor 43 may sense a first sensing voltage VSS_fb and a second sensing voltage Vint_fb at the predetermined position in the pixel area 50, and may determine the voltage difference V_bias between the sensed first sensing voltage VSS_fb and the sensed second sensing voltage Vint_fb. Also, the voltage difference sensor 43 may output a second offset voltage V_offset2 by comparing the calculated voltage difference V_bias with a reference voltage difference Vbias_ref.

The second sensing voltage Vint_fb may be generated by sensing the initialization voltage Vint at the predetermined position in the pixel area 50.

The reference voltage difference Vbias_ref is a value preset for the voltage difference between the initialization voltage Vint and the first supply voltage VSS and may be set differently depending on the luminance of the light-emitting element.

Accordingly, the voltage difference sensor 43 may output the second offset voltage V_offset2 indicating the degree by which the voltage difference between the first supply voltage VSS and the initialization voltage Vint, output from the power manager 40, or specifically from the first supply voltage generator 41, changes in the pixel component 50.

The first supply voltage compensator 44 may generate a reference feedback voltage Vreffb for generating a first supply voltage VSS which is compensated based on the first offset voltage V_offset1 which is the output of the voltage change sensor 42, or based on the second offset voltage V_offset2 which is the output of the voltage difference sensor 43.

The reference feedback voltage Vreffb may be a voltage acquired by correcting a reference voltage Vref based on the first offset voltage V_offset1 or the second offset voltage V_offset2. Here, the reference voltage Vref is a voltage which is used to generate the first supply voltage VSS in the first supply voltage generator 41 (or a voltage that is referred to in order to generate the first supply voltage VSS), and a preset value may be applied thereto. For example, the reference voltage Vref may be a reference value for generating a first supply voltage VSS in a general display device.

The power manager 40 may be implemented in various forms. For example, the power manager 40 may be integrated into the data driver 20 and/or the timing controller 10 illustrated in FIG. 1. Also, the power manager 40 may be implemented as a separate integrated chip (IC), and may be referred to as a Power Management IC (PMIC).

Either of the voltage difference sensor 43 and the voltage change sensor 42 may be selectively included in the power manager 40, but the implementation is not limited thereto. That is, both of the voltage difference sensor 43 and the voltage change sensor 42 may be included in the power manager 40.

Figure 4:
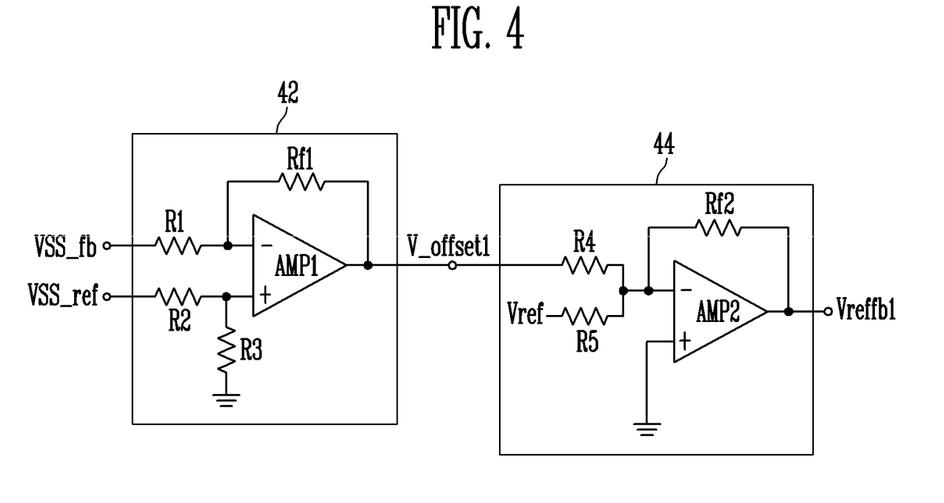
FIG. 4 is a circuit diagram according to an embodiment of the voltage change sensor and the first supply voltage compensator illustrated in FIG. 3.

FIG. 4 is a circuit diagram according to an embodiment of the voltage change sensor and the first supply voltage compensator illustrated in FIG. 3.

Referring to FIG. 4, the voltage change sensor 42 may include a first resistor R1, a second resistor R2, a third resistor R3, a first feedback resistor Rf1, and a first amplifier AMP1. The first resistor R1 may be coupled between a line through which the first sensing voltage VSS_fb is applied and the first input terminal of the first amplifier AMP1. The second resistor R2 may be coupled between a line through which a first reference supply voltage VSS_ref is applied and the second input terminal of the first amplifier AMP1. The third resistor R3 may be coupled between the second input terminal of the first amplifier AMP1 and ground. The first feedback resistor Rf1 may be coupled between the output terminal of the first amplifier AMP1 and the first input terminal of the first amplifier AMP1. The voltage change sensor 42 may output the first offset voltage V_offset1 through the output terminal of the first amplifier AMP1. For example, when the first resistor R1, the second resistor R2, the third resistor R3, and the first feedback resistor Rf1 are the same, the first offset voltage V_offset1 may be a differential voltage between the first sensing voltage VSS_fb and the first reference supply voltage VSS_ref.

The first reference supply voltage VSS_ref may be a value that is preset for the first supply voltage VSS to be supplied to the pixel area 50.

At least one of the first resistor R1, the second resistor R2, the third resistor R3, and the first feedback resistor Rf1 may be a variable resistor.

Referring to FIG. 4, the first supply voltage compensator 44 may include a fourth resistor R4, a fifth resistor R5, a second feedback resistor Rf2, and a second amplifier AMP2.

The fourth resistor R4 may be coupled between the line through which the first offset voltage V_offset1 is applied and the first input terminal of the second amplifier AMP2. The fifth resistor R5 may be coupled between a line through which a reference voltage Vref is applied and the first input terminal of the second amplifier AMP2. The second feedback resistor Rf2 may be coupled between the output terminal and the first input terminal of the second amplifier AMP2.

Here, the reference voltage Vref may be a target voltage for the first supply voltage VSS which is generated in the first supply voltage generator 41 illustrated in FIG. 3, and a preset value may be applied thereto. For example, the reference voltage Vref may be a reference value for generating the first supply voltage VSS in a general display device. The first supply voltage compensator 44 may output the reference feedback voltage Vreffb through the output terminal.

Here, the reference feedback voltage Vreffb may be the voltage acquired by correcting the reference voltage Vref based on the first offset voltage V_offset1 output from the voltage change sensor 42.

Specifically, the first supply voltage compensator 44 may output the reference feedback voltage Vreffb by adding the first offset voltage V_offset1 and the reference voltage Vref, and may change a weight for the addition by changing the fourth resistor R4, the fifth resistor R5, and the second feedback resistor Rf2 (for example, when the same resistor is used, the weight for the addition may be 1). Also, although not illustrated in the drawing, an inverter configured to output the reference feedback voltage Vreffb by reversing the output of the second amplifier AMP2 may further included.

Figure 5:
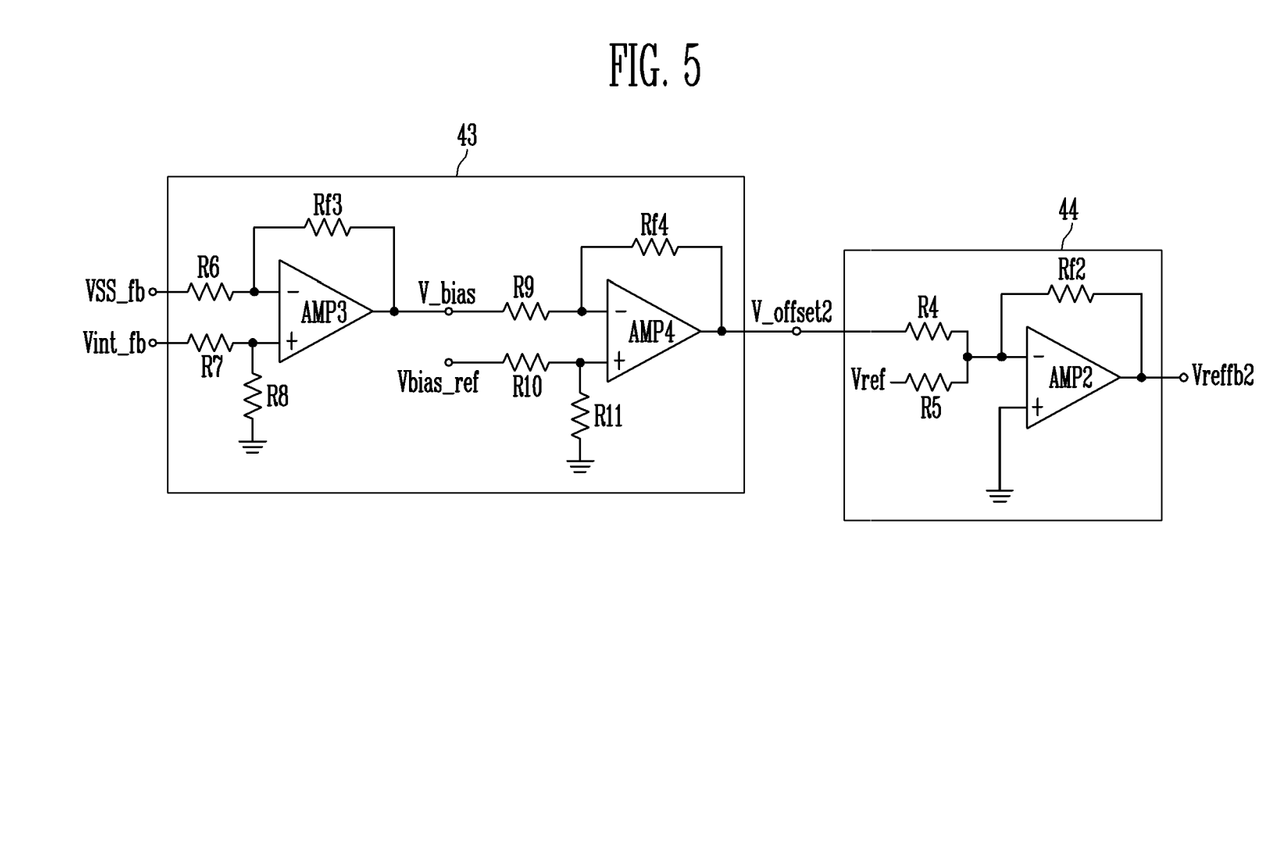
FIG. 5 is a circuit diagram according to an embodiment of the voltage difference sensor and the first supply voltage compensator illustrated in FIG. 3.

FIG. 5 is a circuit diagram according to an embodiment of the voltage difference sensor and the first supply voltage compensator illustrated in FIG. 3.

Specifically, referring to FIG. 5, the voltage difference sensor 43 may include a sixth resistor R6, a seventh resistor R7, an eighth resistor R8, a ninth resistor R9, a tenth resistor R10, an eleventh resistor R11, a third feedback resistor Rf3, a fourth feedback resistor Rf4, a third amplifier AMP3 and/or a fourth amplifier AMP4. The sixth resistor R6 may be coupled between a line through which a first sensing voltage VSS_fb is applied and the first input terminal of the third amplifier AMP3. The seventh resistor R7 may be coupled between a line through which a second sensing voltage Vint_fb is applied and the second input terminal of the third amplifier AMP3. The eighth resistor R8 may be coupled between the second input terminal of the third amplifier AMP3 and ground. The third feedback resistor Rf3 may be coupled between the output terminal of the third amplifier AMP3 and the first input terminal of the third amplifier AMP3. Through the output terminal of the third amplifier AMP3, the voltage difference V_bias between the first sensing voltage VSS_fb and the second sensing voltage Vint_fb may be output (when the sixth resistor R6, the seventh resistor R7, the eighth resistor R8, and the third feedback resistor Rf3 are the same). That is, the voltage difference sensor 43 may calculate and output the voltage difference V_bias between the first sensing voltage VSS_fb and the second sensing voltage Vint_fb.

Next, the ninth resistor R9 may be coupled between the output terminal of the third amplifier AMP3 and the first input terminal of the fourth amplifier AMP4. The tenth resistor R10 may be coupled between a line through which a reference voltage difference Vbias_ref is applied and the second input terminal of the fourth amplifier AMP4. The reference voltage difference Vbias_ref may be a value preset for the voltage difference (Vint−VSS) between the first supply voltage VSS and the initialization voltage Vint based on the luminance (or grayscale value) of the light-emitting element. The eleventh resistor R11 may be coupled between the second input terminal of the fourth amplifier AMP4 and ground. The fourth feedback resistor Rf4 may be coupled between the output terminal of the fourth amplifier AMP4 and the first input terminal of the fourth amplifier AMP4. Through the output terminal of the fourth amplifier AMP4, the second offset voltage V_offset2 may be output.

For example, when the ninth resistor R9, the tenth resistor R10, the eleventh resistor R11, and the fourth feedback resistor Rf4 are the same, the second offset voltage V_offset2 may be a differential voltage between the reference voltage difference Vbias_ref and the voltage difference V_bias between the first sensing voltage VSS_fb and the second sensing voltage Vint_fb. That is, the voltage difference sensor 43 may output the second offset voltage V_offset2 by comparing the reference voltage difference Vbias_ref with the voltage difference V_bias between the first sensing voltage VSS_fb and the second sensing voltage Vint_fb.

When the second offset voltage V_offset2 is output from the voltage difference sensor 43, the output second offset voltage V_offset2 may be applied to one end of the fourth resistor in the first supply voltage compensator 44. Comparing this with FIG. 4, not the first offset voltage V_offset1 but the second offset voltage V_offset2 is applied to one end of the fourth resistor. Because the configuration of the first supply voltage compensator 44 is the same as that in FIG. 4, a description made with reference to FIG. 4 may be applied.

For example, the first supply voltage compensator 44 may output the reference feedback voltage Vreffb by adding the reference voltage Vref to the second offset voltage V_offset2 output from the voltage difference sensor 43. Here, the reference feedback voltage Vreffb, which the first supply voltage compensator 44 outputs by receiving the second offset voltage V_offset2, may be referred to as a second reference feedback voltage Vreffb2. Also, the reference feedback voltage Vreffb that the first supply voltage compensator 44 outputs by receiving the first offset voltage V_offset1 in FIG. 4 may be referred to as the first reference feedback voltage Vreffb1.

Figure 6:
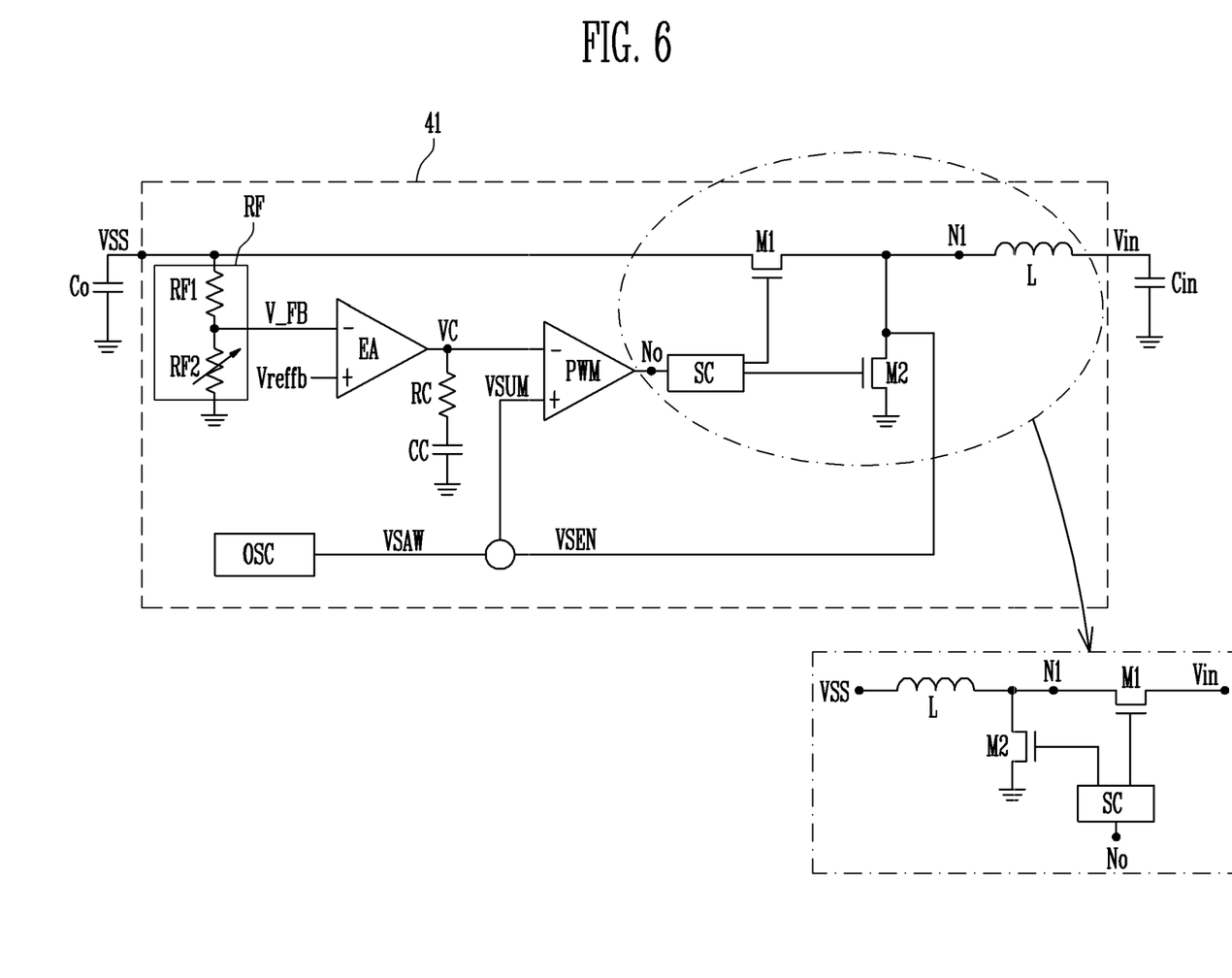
FIG. 6 is a circuit diagram according to an embodiment of the first supply voltage generator illustrated in FIG. 3.

FIG. 6 is a circuit diagram according to an embodiment of the first supply voltage generator illustrated in FIG. 3.

Referring to FIG. 6, the first supply voltage generator 41 may include a first switching element M1, a second switching element M2, an inductor L, a voltage distributor RF, an error amplifier EA, a PWM controller PWM, and a switching controller SC.

The inductor L may be coupled between an input terminal through which an input voltage Vin is applied and a first node N1.

The first switching element M1 may be coupled between the first node N1 and an output terminal through which a first supply voltage VSS is output. The second switching element M2 may be coupled between the first node N1 and ground. The gates of the first switching element and the second switching element are coupled to the output of the switching controller SC, whereby on/off of the first and second switching elements may be controlled by the switching controller SC.

When the first switching element M1 is turned off and when the second switching element M2 is turned on, energy may be stored in the inductor L by the input voltage Vin. Subsequently, when the first switching element M1 is turned on and when the second switching element M2 is turned off, the current based on the input voltage is combined with the current stored in the inductor, whereby the first supply voltage VSS that is amplified compared to the input voltage may be generated at the output terminal of the first supply voltage generator 41.

The voltage distributor RF may output a feedback voltage V_FB by distributing the first supply voltage VSS at the output terminal. Specifically, the voltage distributor RF may include a first feedback resistor RF1 and a second feedback resistor RF which are coupled in series between the output terminal and ground, and may output the feedback voltage V_FB by distributing the first supply voltage VSS depending on the ratio of the size of the first feedback resistor RF1 and that of the second feedback resistor RF2.

The error amplifier EA amplifies an error between the feedback voltage V_FB of the voltage distributor RF and the reference feedback voltage Vreffb, thereby outputting a control voltage VC to the output terminal thereof. Here, the reference feedback voltage Vreffb may be the output of the first supply voltage compensator described with reference to FIGS. 3 to 5. Additionally, a first resistor RC and a first capacitor CC may be coupled in series between the output VC of the error amplifier EA and ground.

The PWM controller PWM receives the control voltage VC output from the error amplifier EA and a sum frequency signal VSUM, thereby outputting a Pulse Width Modulation (PWM) control signal for controlling a switching duty ratio between the first switching element M1 and the second switching element M2. For example, the PWM controller may be implemented as an amplifier.

The switching controller SC may receive the PWM control signal and perform on/off control of the first switching element M1 and the second switching element M2 such that the first switching element M1 and the second switching element M2 are alternately switched.

The sum frequency signal VSUM may be generated by adding the voltage VSEN applied from the input terminal and the frequency source signal VSAW of an oscillator OSC. The frequency source signal VSAW is a signal for generating a clock signal having a specific frequency, and may be provided by the oscillator OSC.

Meanwhile, connections between the inductor L, the first switching element M1, and the second switching element M2 in the first supply voltage generator 41 are differently implemented. For example, as illustrated in the lower right corner of FIG. 6, the first switching element M1 may be coupled between the first node N1 and the input terminal through which the supply voltage Vin is applied. The second switching element M2 may be coupled between the first node N1 and ground. The inductor L may be coupled between the first node N1 and the output terminal through which the first supply voltage VSS is output. In this embodiment, when the first switching element M1 is turned on and when the second switching element M2 is turned off, energy may be stored in the inductor L by the input voltage Vin. Next, when the first switching element M1 is turned off and when the second switching element M2 is turned on, the current stored in the inductor L flows in the output terminal of the first supply voltage generator 41, whereby the first supply voltage VSS that is reduced compared to the input voltage Vin may be generated at the output terminal of the first supply voltage generator 41. The connections between the remaining elements in the above-described embodiment are the same as those described in the embodiment illustrated in the upper part of FIG. 6, and thus a detailed description thereof will be omitted.

Figure 7:
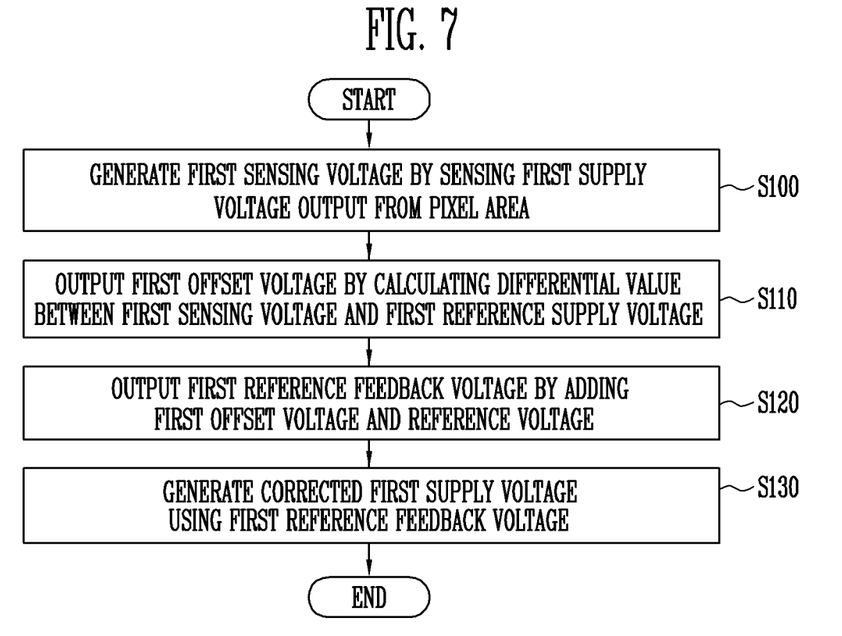
FIG. 7 is a first flowchart for a method for driving a display device according to an embodiment of the present disclosure.
Figure 8:
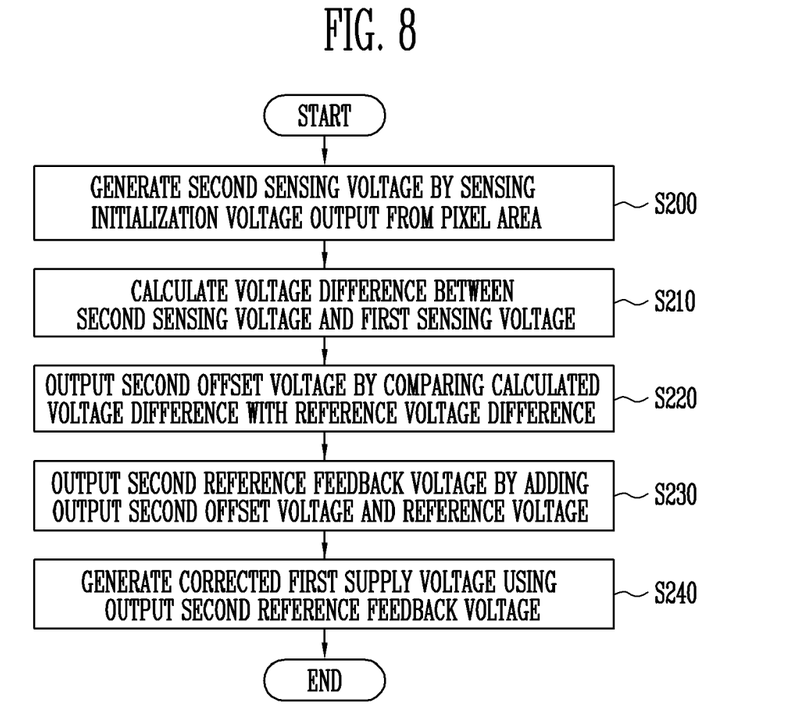
FIG. 8 is a second flowchart for a method for driving a display device according to an embodiment of the present disclosure.

FIG. 7 is a first flowchart for a method for driving a display device according to an embodiment of the present disclosure. FIG. 8 is a second flowchart for a method for driving a display device according to an embodiment of the present disclosure.

Referring to FIG. 7, the method for driving a display device may include generating a first sensing voltage VSS_fb at step S100 by sensing an amount of change of a first supply voltage VSS output from a power manager in a pixel area, outputting a first offset voltage V_offset1 at step S110 by calculating a differential value between the first sensing voltage VSS_fb and a first reference supply voltage VSS_ref, outputting a first reference feedback voltage Vreffb1 at step S120 by adding the first offset voltage V_offset1 and a reference voltage Vref, and generating a corrected first supply voltage VSS using the first reference feedback voltage Vreffb1 at step S130.

The first supply voltage VSS may be a voltage that is supplied to one end of a light-emitting element EL in the pixel P illustrated in FIG. 2. The first sensing voltage VSS_fb may be a voltage acquired by measuring the first supply voltage that is actually driven at a predetermined point in the pixel area 50 illustrated in FIG. 1. The first offset voltage V_offset1 may be a differential value between the first sensing voltage VSS_fb and the first reference supply voltage VSS_ref. The reference feedback voltage Vreffb may be input to the second input terminal of an error amplifier EA included in the first supply voltage generator 41 illustrated in FIG. 6.

The driving method illustrated in FIG. 7 may be performed by the display device 100 illustrated in FIG. 1. More specifically, steps S100 and S110 may be performed by the voltage change sensor 42 illustrated in FIG. 3 and FIG. 4, step S120 may be performed by the first supply voltage compensator 44 illustrated in FIG. 3 and FIG. 4, and step S130 may be performed by the first supply voltage generator 41 illustrated in FIG. 3 and FIG. 6.

Referring to FIG. 8, after step S100 in FIG. 7, generating a second sensing voltage Vint_fb at step S200 by sensing an amount of change of an initialization voltage Vint output from the power manager in the pixel area, calculating a voltage difference V_bias between the second sensing voltage Vint_fb and the first sensing voltage VSS_fb at step S210, outputting a second offset voltage V_offset2 at step S220 by comparing the calculated voltage difference V_bias and a reference voltage difference Vbias_ref, outputting a second reference feedback voltage Vreffb2 at step S230 by adding the output second offset voltage V_offset2 and the reference voltage Vref, and generating a corrected first supply voltage VSS using the output second reference feedback voltage Vreffb2 at step S240 may be included.

The initialization voltage Vint may be the voltage that is supplied to one end of each of the fourth transistor T4 and the seventh transistor T7 in the pixel P illustrated in FIG. 2. The second offset voltage V_offset2 may be a differential value between the voltage difference V_bias calculated at step S210 and the reference voltage difference Vbias_ref.

Steps illustrated in FIG. 8 may be performed in parallel with steps illustrated in FIG. 7, or may be selectively performed.

A display device and a method for driving the same according to the present disclosure may compensate for the IR drop of a voltage supplied to a light-emitting element.

Accordingly, the optical characteristics of the light-emitting element are prevented from being deteriorate, and optical characteristics of low luminance and low grayscales are improved. Therefore, there is an advantage in which it is simple to implement a High Dynamic Range (HDR).

Those skilled in the art to which the present disclosure pertains will understand that the present disclosure may be practiced in other detailed forms without departing from the technical spirit or essential features thereof. Therefore, it should be understood that the above-described embodiments are only exemplary in all aspects rather than being restrictive. It is intended that the scope of the present disclosure should be defined by the accompanying claims rather than the above-described descriptions, and various modifications, additions and substitutions, which can be derived from the meaning, scope and equivalent concepts of the accompanying claims, fall within the scope of the present disclosure.

What is claimed is:

1. A display device, comprising:
a pixel area including pixels;
a timing controller configured to generate a control signal based on an input image;
a data driver configured to supply a data voltage to data lines coupled to the pixels depending on the control signal;
a scan driver configured to supply scan signals to scan lines coupled to the pixels depending on the control signal; and
a power manager configured to supply an initialization voltage for initializing the pixels and a first supply voltage for driving the pixels,
wherein the power manager comprises:
a voltage change sensor configured to output a first offset voltage based on a first sensing voltage, wherein the first sensing voltage is a voltage difference between an input and an output of the first supply voltage at a predetermined position in the pixel area;
a first supply voltage compensator configured to output a reference feedback voltage for generating the first supply voltage based on the first offset voltage; and
a first supply voltage generator configured to change the first supply voltage based on the reference feedback voltage and supply the changed first supply voltage to the pixel area.

2. The display device according to claim 1, wherein the voltage change sensor comprises:
a first amplifier including a first input terminal configured to receive the first sensing voltage via a first resistor, a second input terminal configured to receive a first reference supply voltage via a second resistor, and an output terminal configured to output the first offset voltage; and
a first feedback resistor coupled between the output terminal and the first input terminal of the first amplifier.

3. The display device according to claim 2, wherein the voltage change sensor further comprises:
a third resistor coupled between the second input terminal and ground.

4. The display device according to claim 3, wherein at least one of the first resistor, the second resistor, the third resistor, and the first feedback resistor is a variable resistor.

5. The display device according to claim 1, wherein the first supply voltage compensator comprises:
a second amplifier including a first input terminal configured to receive the first offset voltage via a fourth resistor and receive a reference voltage via a fifth resistor, and an output terminal configured to output the reference feedback voltage; and
a second feedback resistor coupled between the output terminal and the first input terminal of the second amplifier.

6. The display device according to claim 1, wherein the power manager further comprises:
a voltage difference sensor configured to sense a second sensing voltage in the pixel area and output a second offset voltage which is a voltage difference between the first sensing voltage and the second sensing voltage, wherein the second sensing voltage is a voltage difference between an input and an output of the initialization voltage in the pixel area.

7. The display device according to claim 6, wherein the first supply voltage compensator outputs the reference feedback voltage based on the second offset voltage.

8. The display device according to claim 6, wherein the voltage difference sensor comprises:
a third amplifier including a first input terminal configured to receive the first sensing voltage via a sixth resistor, a second input terminal configured to receive the second sensing voltage via a seventh resistor, and an output terminal configured to output the calculated voltage difference between the first sensing voltage and the second sensing voltage; and
a third feedback resistor coupled between the output terminal and the first input terminal of the third amplifier.

9. The display device according to claim 8, wherein the voltage difference sensor further comprises:
an eighth resistor coupled between the second input terminal of the third amplifier and ground.

10. The display device according to claim 9, wherein the voltage difference sensor further comprises:
a fourth amplifier including a first input terminal configured to receive the calculated voltage difference via a ninth resistor, a second input terminal configured to receive a reference voltage difference via a tenth resistor, and an output terminal configured to output the second offset voltage; and
a fourth feedback resistor coupled between the output terminal and the first input terminal of the fourth amplifier.

11. The display device according to claim 1, wherein the first supply voltage generator outputs the first supply voltage through an output terminal by converting an input voltage received through an input terminal and changes the first supply voltage which is output through the output terminal of the first supply voltage generator using the reference feedback voltage applied to a feedback circuit.

12. The display device according to claim 11, wherein the first supply voltage generator comprises:
a first switching element, a second switching element, a switching controller configured to control switching of the first switching element and the second switching element, a voltage distributor configured to output a feedback voltage by distributing the first supply voltage output through the output terminal of the first supply voltage generator, and an error amplifier configured to output a control voltage by amplifying an error between the feedback voltage and the reference feedback voltage.

13. The display device according to claim 12, wherein the first supply voltage generator further comprises:
a PWM controller configured to receive the control voltage and a sum frequency signal and to output a Pulse Width Modulation (PWM) control signal for controlling a switching duty ratio between the first switching element and the second switching element.

14. The display device according to claim 13, wherein the switching controller performs on/off control of the first switching element and the second switching element such that the first switching element and the second switching element are alternately switched using the PWM control signal.

15. The display device according to claim 13, wherein the first supply voltage generator further comprises:

an inductor coupled between the input terminal of the first supply voltage generator and a first node.

16. The display device according to claim 15, wherein the first switching element is coupled between the first node and the output terminal of the first supply voltage generator.

17. The display device according to claim 15, wherein the second switching element is coupled between the first node and ground.

18. A method for driving a display device, comprising:
generating a first sensing voltage by sensing a first supply voltage output from a pixel area;
outputting a first offset voltage by calculating a differential value between the first sensing voltage and a first reference supply voltage;
outputting a first reference feedback voltage by adding the first offset voltage and a reference voltage; and
generating a corrected first supply voltage using the first reference feedback voltage.

19. The method according to claim 18, further comprising:
generating a second sensing voltage by sensing an initialization voltage output from the pixel area;
calculating a voltage difference between the second sensing voltage and the first sensing voltage;
outputting a second offset voltage by comparing the calculated voltage difference and a reference voltage difference;
outputting a second reference feedback voltage by adding the output second offset voltage and the reference voltage; and
generating a corrected first supply voltage using the second reference feedback voltage.

20. A display device, comprising:
a pixel area including pixels;
a timing controller configured to generate a control signal based on an input image;
a data driver configured to supply a data voltage to data lines coupled to the pixels depending on the control signal;
a scan driver configured to supply scan signals to scan lines coupled to the pixels depending on the control signal; and
a power manager configured to supply an initialization voltage for initializing the pixels and a supply voltage for driving the pixels,
wherein the power manager comprises:
a voltage difference sensor configured to output a voltage difference between the initialization voltage and a sensing voltage, wherein the sensing voltage is a difference between an input and an output of the supply voltage at a predetermined position in the pixel area;
a supply voltage compensator configured to output a reference feedback voltage for generating the supply voltage based on the voltage difference; and
a supply voltage generator configured to change the supply voltage based on the reference feedback voltage and supply the changed supply voltage to the pixel area.

* * * * *